March 27, 1934.  J. W. GRAY  1,953,013
ART OF DISTILLATION
Filed July 15, 1929  2 Sheets-Sheet 2
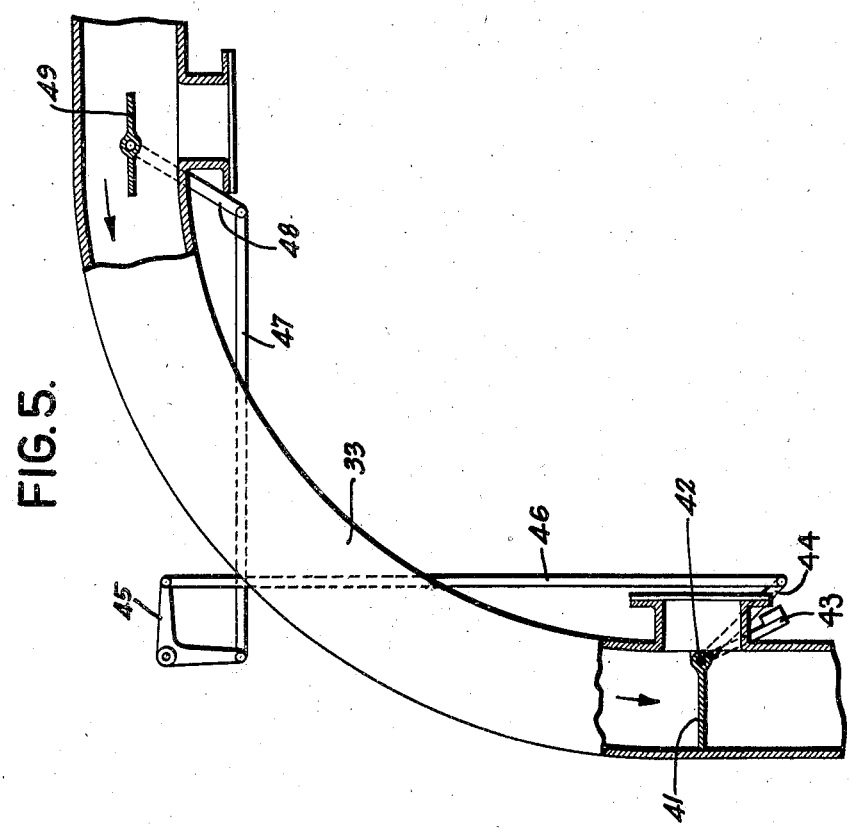
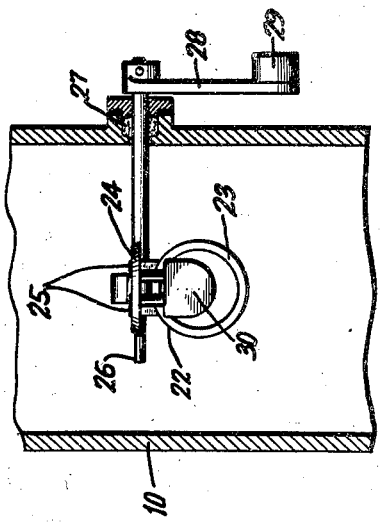
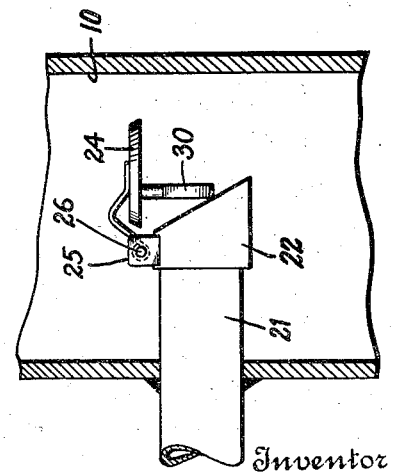
Inventor
By their Attorney James W. Gray.
P. J. Dearborn.

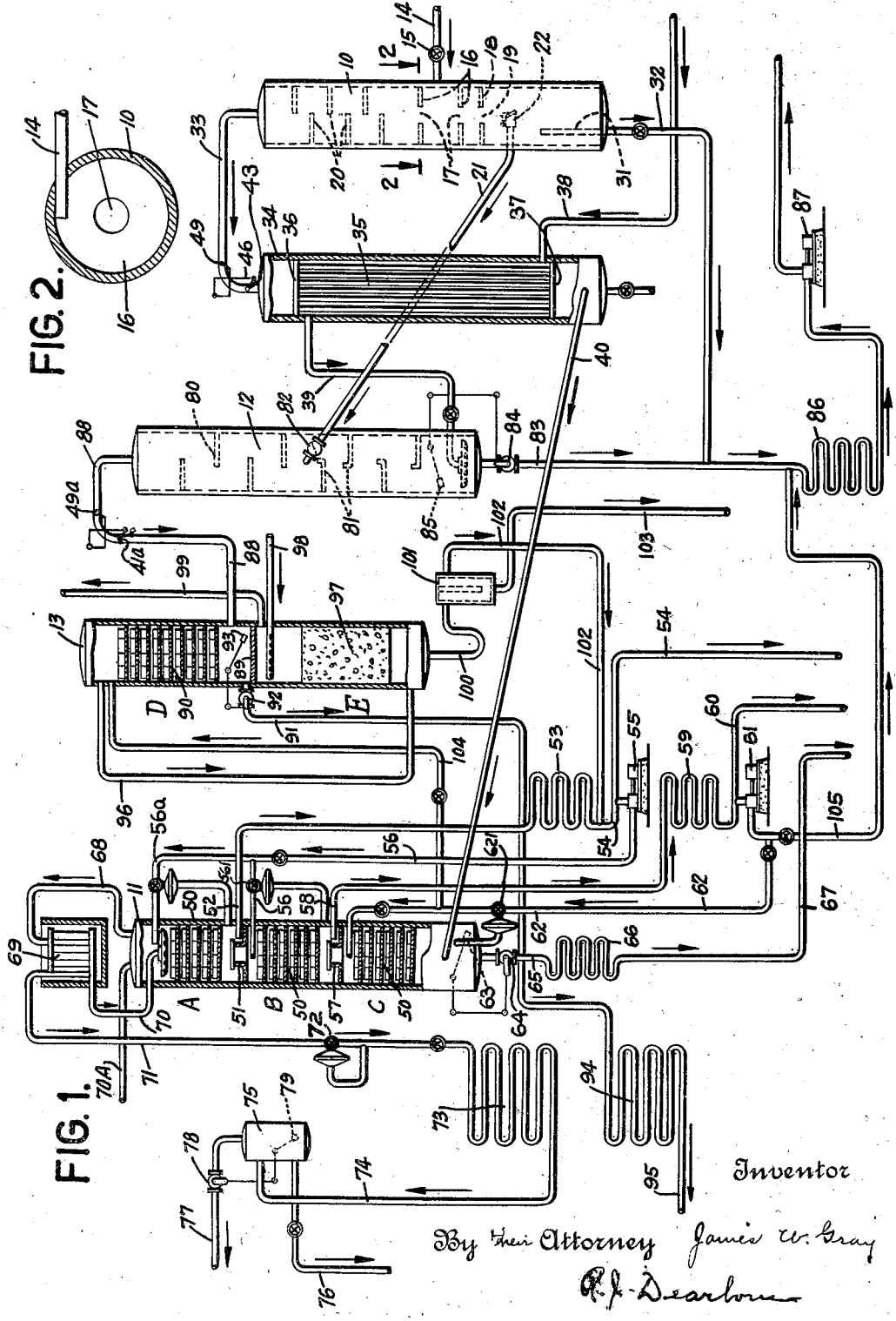

Patented Mar. 27, 1934

1,953,013

UNITED STATES PATENT OFFICE 1,953,013

ART OF DISTILLATION

James W. Gray, Port Arthur, Tex., assignor to The Texas Company, New York, N. Y., a corporation of Delaware Application July 15, 1929, Serial No. 378,237

10 Claims. (Cl. 196—71)

This invention relates to certain novel improvements in the art of distillation and has particular reference to the distillation of hydrocarbon oils.

One of the objects of the invention is to facilitate the separation of the vapors and gases from the liquid in the distillation chamber. In furtherance of this object the invention contemplates the delivery of the material to be distilled or vaporized into the vaporizing chamber tangentially of the chamber in order to thereby impart to the oil a whirling motion and facilitate a separation of vapors and gases from liquid by centrifugal action. It is also contemplated that the fluid to be distilled may be delivered into the vaporizing chamber tangentially between baffles formed with central holes so that the liquid may be given a whirling motion about the baffles and the separation of the vapors and gases is facilitated by reason of the central openings.

The invention is particularly applicable to what is commonly referred to as a tube still or pipe still operation in which the oil to be vaporized is first heated in a coil to approximately the desired temperature and then discharged in accordance with the invention tangentially between concentric central hole baffles to effect the desired vaporization. The invention is well adapted for any distillation system in which the oil to be vaporized is fed from a high pressure source either in the form of tubular heaters or other heating chambers or stills and discharged into a vaporizing chamber for distillation at a lower pressure and thus the invention may advantageously be practiced by withdrawing liquid or residue from pressure cracking converters or stills and introducing the liquid or residue tangentially of the vaporizing chamber between central hole baffles to effect the separation of vapors and gases from the unvaporized residue.

One of the objects of the invention is to prevent the withdrawal of the unvaporized residue in the distilling chamber until it has been distilled to the desired extent. In distillation systems wherein the withdrawal of residue is dependent upon the action of a float in the distilling chamber the greater the quantity of material introduced into the chamber the greater is the amount of residue withdrawn and the result is that during periods of heavy influx of material into the still the consequent increased withdrawal of material operates to thereby remove from the still material that has not been distilled to the proper degree. Thus when distilling pressure bottoms, during periods of heavy drags from the cracking stills the increase in the influx of material to the tar stripping chamber, if the withdrawal of material therefrom be controlled by a float operated valve, necessarily causes an increase in withdrawal of material therefrom so that the tar which has been incompletely expanded or distilled, that is, containing quantities of light material which should properly be removed as a vapor fraction, is withdrawn from the still. In accordance with the invention the withdrawal of material from the still is not made dependent solely upon the liquid level in the still and the withdrawal of material is retarded during periods of increased influx of material to the still so that the oil to be distilled may be properly expanded and vaporized to the degree desired before the residue is withdrawn.

The principles of the invention as set forth in the preceding paragraph have a particular application, for example, in tar stripping equipment where the stripping operation is conducted in a plurality of stills such as a primary still which receives the residue from the pressure cracking stills and a secondary still in which the residue from the primary still is further distilled with the aid of steam. If the passage of residue from the primary still to the secondary still were controlled solely by a float mechanism increases in the influx of residue to the primary still, caused by heavier drags or more frequent drags from the pressure stills, would necessarily cause an increase in the passage of residue from the primary still to the steam still thus increasing the pressure in the latter still. In cases where low pressure steam is used in the secondary still the increase in pressure in this still due to the increased charge thereto may be sufficient to cause the residue to get into the steam lines. It is difficult to prevent this result by the use of check valves in the steam lines because once such valves have become coked with the residue they are rendered largely ineffective. In the practice of the invention by retarding the delivery of residue from the primary still to the secondary still, even during periods of increased charge to the primary still, it is possible to prevent the undue rise in pressure in the secondary still and thus greatly facilitate the use of low pressure steam in that still.

An important object of the invention is to promote an even distillation of material obtained from a pressure source even though the pressure may vary within comparatively wide limits. The object is to prevent undue rises in pressure, to cut down the peaks of the pressure curve, to smooth out to a great extent such fluctuations as may occur. Thus in accordance with the invention a vaporizing chamber may be provided with a vapor line leading to a dephlegmator and with a valve in the vapor line arranged to retard the flow of vapor into the dephlegmator as the pressure or the flow of vapor from the vaporizing chamber increases. In this way even though the pressure and volume of the charge admitted to the vaporizing chamber may vary within comparatively wide limits the variations in pressure in the dephlegmator are greatly decreased so that the dephlegmation or fractionation carried on therein may be operated to yield the desired products of approximately uniform characteristics during the run.

In order to more fully disclose the invention reference will now be had to the accompanying drawings in which equipment that is particularly adapted for the stripping or distillation of tar or residue obtained from cracking stills is shown and wherein:

Figure 1 is a diagrammatic sectional elevation of an apparatus constructed in accordance with the invention and constituting an embodiment thereof.

Figure 2 is a enlarged partial section taken on the line 2—2 of Figure 1.

Figure 3 is an enlarged partial section of the primary distilling chamber showing valve mechanism controlling the transfer of liquid to the secondary distilling chamber.

Figure 4 is an enlarged view of this valve in side elevation.

Figure 5 is an enlarged view in diagrammatic elevation showing a means for controlling the passage of vapor from the primary distilling chamber to its fractionating tower.

Referring now more particularly to Figure 1, it will be seen that the apparatus illustrated includes a primary distilling chamber 10 in vapor communication with a fractionating tower 11 and a secondary distilling chamber 12 in vapor communication with a fractionating tower 13 and arranged to receive the partly distilled residue from the primary still 10. The oil to be distilled is introduced to the still 10 by means of a charging line 14 which may have a valve 15 for regulating the admission of oil to the still 10 and also, if necessary, for reducing pressure from that obtaining at the source of supply. The line 14 may communicate with one or more batteries of cracking converters or stills and is adapted for conducting tar or residue from the cracking stills to the expansion and distilling chamber 10.

The charging line 14 is shown as entering the distilling tower 10 at an intermediate point therein between baffles 16 which are in the form of circular discs suitably secured to the shell of the chamber 10 and formed with concentric central openings 17, as shown. The line 14, as clearly indicated in Figure 2, is arranged to discharge the oil tangentially into the chamber 10 so as to impart a whirling movement of the oil adjacent the baffles 16. The diameter of each of the openings 17 may be the same. However, if the holes be made of different diameters it is ordinarily preferable that the upper opening 17 be of the smaller diameter since, if the upper opening be of greater diameter than the lower opening there may be a tendency to decrease the capacity for efficient separation of gas and vapors from the liquid. Underneath the baffle 16 one or more similar baffles 18 may be provided, as shown in the form of a circular disc having a central opening so as to thus assist in continuing the centrifugal action initiated between the baffles 16. Above the baffles 16 a plurality of baffles 20 are disposed in staggered relation, these baffles being preferably of semi-circular shape and extending preferably only to the center of the chamber so that plates mounted on opposite sides will not overlap. It may even be preferable under certain conditions to have these baffles extend less than to the center of the chamber, since their primary function is to bring about a tortuous path of movement of the vapors and to knock back the liquid particles entrained therewith. This can be done quite effectively without overlapping of the baffles, which would tend to reduce the capacity of the chamber.

The line 21 is arranged to conduct liquid from the primary distilling chamber 10 to the secondary distilling chamber 12. As clearly shown in Figures 3 and 4 the end of the line 21 in the chamber 10 is connected to a fitting 22 formed with an angular face 23 which constitutes a seat for a flapper valve 24. The fitting 22 carries lugs or bosses 25 within which is mounted a pin or shaft 26 which constitutes a pivotal support for the valve 24. The shaft 26 extends outside the wall of the still 10 through a stuffing box 27 and carries a lever arm 28 provided with a weight 29 which is arranged to normally hold the valve 24 in open position. The flapper valve 24 carries a paddle or element 30 disposed at an angle to it so that when the valve is open the flow of fluid entering the valve chamber 22 will come in contact with the element 30 so as to thus tend to close the valve. The extent of movement of the valve 24 from the closed to the wide open position is preferably limited. Thus for example the valve seat 23 may be at an angle of approximately 60° and the valve 24 permitted to move within about a 60° arc from the closed to the wide open position. It is preferable to provide the valve mechanism so that the valve will normally be either in the wide open or fully closed position and so arranged that whenever the force directed against the element 30 is sufficient to overcome the force of the weight 29 tending to hold the valve open, the valve will thereupon close with an accelerated movement. It will then stay closed until the up-stream pressure falls to within a predetermined differential in excess of the down-stream pressure. This differential is determined by the size of weight 29, the length of lever arm 28 and the effective area of seat 24.

It is sometimes desirable for flushing purposes to withdraw residue from the lower part of the chamber 10 in addition to that which is normally discharged through the line 21 and to accomplish this a slotted pipe 31 is shown extending upwardly from the bottom of the distilling chamber 10 and communicating with a drawoff line 32. By having the pipe 31 slotted it is possible to withdraw liquid from the chamber 10 at points above any coke deposits that may collect in the lower end of the chamber. It is advantageous to insert temperature indicating means at different levels in the lower portion of the chamber so as to indicate to the operator the building up of any coke deposits and the desirability of withdrawing liquid through the pipe 31. The accumulation of coke in the chamber may be indicated by a decrease in temperature at the place where the deposit may occur. Ordinarily it is preferable to make drags through the line 31 at the periods of maximum pressure in the tower 10 which normally is at approximately the end of a drag from the pressure stills through the line 14.

The vapors and gases separated in the tower 10 are withdrawn through a vapor line 33. Instead of extending directly to the fractionating tower 11 this line is shown as leading to a heat exchange element 34 for heating the steam supplied to the secondary distilling chamber 12 so as to thus enable the utilization of low temperature or exhaust steam. The vapor line 33 is shown as terminating at the upper end of the chamber 34 which is formed into an upper header by means of a plate 36. A plurality of tubular elements 35 positioned within the chamber extend from the plate 36 to a lower plate 37 which forms a header at the lower end of the chamber. The vapors pass from the upper header through the tubes 35 to the lower header. An exhaust steam line 38 admits steam to the space around the tubes above the plate 37 while an outlet line 39 is provided for the steam just below the plate 36. The steam in passing through the shell of the exchanger is heated by means of the hot vapors passing downwardly through the tubes of the exchanger and the vapors together with such condensate as is formed enter the pipe 40 by which the vapors and liquid condensate are conducted to the tower 11.

To control the passage of vapor from the distilling chamber 10 to the fractionating tower 11 and to prevent undue rises in pressure in the fractionating tower the valve mechanism shown in Figure 5 is provided. The valve actuating mechanism includes a leaf or sheet 41 pivoted at 42 and disposed within the pipe 33 in the path of the vapors. The passage of vapor through the pipe 33 tends to swing the element 41 on its pivot, it tending to approach a vertical position or position parallel with the flow of vapor at maximum pressure or vapor flow. The pin 42 extends exteriorly of the pipe 33 and carries a weighted element 43 which tends to hold the element 41 in the horizontal position or in a position crosswise of the flow of vapors. A lever arm 44 is also secured to the pin 42 and is in operative connection with one arm of a rocker arm 45 by means of a connecting rod 46. The other arm of the rocker arm 45 is connected by rod 47 to a lever 48 arranged to operate a butterfly valve 49 within the pipe 33. When the pressure rises in the still 10 due to increased influx of material from the line 14 the increased vaporization produces a greater pressure head on the line and increased flow through the line 33 so that the element 41 is moved toward the vertical position to thus actuate the lever 44, connecting rod 46, rocker arm 45, connecting rod 47 and lever 48 to move the valve 49 toward the closed position. In other words the greater the pressure on the leaf 41 or the greater the flow of fluid through the line 33 the greater the tendency for the valve 49 to move to the closed position and thus retard or stop the flow of vapor. The arm carrying the weighted element 43 is preferably placed at such an angle that the restoring force tending to return the leaf 41 to its horizontal position increases as the leaf is forced more and more into the vertical position. As a result of this control mechanism, in spite of wide fluctuations in pressure in the distilling chamber 10, the transfer of these violent fluctuations to the tower 11 is prevented. While there may be some pressure variation in the tower 11 the peak pressure loads are topped off so that it is thus possible to obtain in the tower 11 distillates of more uniform character throughout a run than could be obtained if the extreme pressure fluctuations which may take place in the chamber 10 were permitted to be transferred into the tower 11.

The vapor line 40 extends to the bottom of the tower 11 which is shown formed with a plurality of sections A, B, and C, each of which sections is made up of a plurality of bubble trays 50. A trap 51 is shown for collecting condensate from the section A and a line 52 extending to a cooling coil 53 is provided for the removal of this cut from the fractionating tower. An outlet pipe 54 extends from the cooling coil 53 to tankage (not shown). A reflux pump 55 is connected to the line 54 and provided with a discharge line 56 so as to pump a portion or all of the condensate to the section B to serve as a reflux therefor.

In order to regulate the quantity of reflux thus returned to the section B, the line 56 will preferably be provided with a pressure-controlled valve 561 so arranged that it will be opened a greater or less extent, depending upon the pressure at the bottom of the section B. Thus when an increase in pressure occurs at the bottom of section B, due to a greater quantity of vapors being passed to the tower by the line 40, the valve 561 will be opened to a greater extent to permit the introduction of a greater amount of reflux. The pressure-controlled diaphragm for operating the valve 561 may be of conventional construction, although it will preferably be provided with a relatively strong spring so that the extent to which the valve is opened when the pressure increases will depend upon the amount of such pressure. A trap 57 is provided for receiving condensate from the section B and an outlet line 58 extends to a cooling coil 59 for removing this fraction from the tower. An outlet line 60 extends from the cooling coil 59 to tankage (not shown). A reflux pump 61 is connected to the line 60 and provided with a discharge line 62 for introducing as a reflux to the section C a portion or all of the condensate taken off from section B. A pressure-controlled valve 621 will preferably be provided in the line 62 and may be controlled by the pressure at the bottom of the tower 11 in a manner similar to the control of the valve 561. The final condensate formed in the tower is collected in the bottom and the discharge of this liquid from the tower may be controlled by means of a float 63 operatively connected to a valve 64 in an outlet line 65. The outlet line is shown extending to a cooling coil 66 provided with a discharge line 67 extending to tankage (not shown).

A vapor line 68 extends from the tower 11 to a reflux condenser 69 provided with a reflux condensate line 70 for conducting reflux to the upper section A of the tower 11. The reflux condenser 69 may be water-cooled or otherwise cooled, as may be desired. The line 56 is shown provided with a branch line 56a so that if desired a portion of the condensate from the condenser 53 may be admitted as reflux to the upper section A. This branch line may similarly be provided with a pressure-controlled valve regulated by the pressure at the bottom of section A in the same way that the valve 561 is controlled. A vapor line 71 shown with a pressure regulating valve 72 extends to a condenser coil 73 provided with an outlet line 74 to a receiver or accumulator drum 75. The pressure regulating valve 72 may be operated in any suitable manner. It may be operated merely by hand, although one advantageous arrangement is to operate the valve 72 by a pressure diaphragm, as shown, controlled by the down stream pressure so that when the pressure in the condenser rises, the valve moves to the closed position to thus reduce or entirely stop the delivery of liquid to the condenser 73. A line 77 is shown having a valve 78 controlled by the float 79 in the drum 75. The valve 78 may be so operated by the float 79 that when the liquid level is relatively high no gas is allowed to escape through the line 77 but with decreased liquid levels gas is permitted to escape. By partially closing the valve in the outlet pipe 76 the flow of gas and naphtha into the receiving drum 75 can be regulated. It should be noted here that due to the admixture of gases with the liquid hydrocarbons rising through the pipe 74, the gas lift principle becomes effective to permit placing the drum 75 at a relatively high elevation with a small pressure drop through this pipe. This makes it possible to operate the system under extremely low pressures in the tower 11 and drum 75 without requiring a pump to force the distillate from the drum to tankage.

If desired, distillate from the line 74 or drum 75 may be pumped to the top of the tower 11 to serve as a reflux therefor, in addition to or in lieu of the reflux supplied by the run-back line 70. A line 70a is indicated for supplying this reflux, which line may extend to a pump (not shown) that may be connected to the line 74 or drum 75. A convenient method of regulating the pumping of reflux through the line 70a to the tower 11 is to provide automatic means for controlling the rate of pumping in accordance with the pressure obtaining in the tower, just as the valves 561 and 621 are controlled. This automatic means may be arranged to function so that as the pressure increases in the tower the amount of reflux admitted will be increased.

The secondary distilling chamber 12 is shown in the form of a tower provided interiorly with a plurality of baffles 80 in the upper portion thereof and a plurality of pans or trays 81 in the lower portion thereof. The line 21, which introduces residue from the primary distilling chamber 10, is shown entering the tower 12 at an intermediate point therein so as to discharge liquid onto the pans 81 while the evolved vapors will be obstructed in their passage by the baffles 80. The line 21 may be provided with a check valve 82 so as to prevent the discharge of any fluid from the still 12 back to the still 10 in case the pressure in the still 12 should ever rise above that obtaining in the still 10. The line 39 is shown entering the lower portion of the tower 12 for introducing steam which has been heated in the heat exchanger 34.

The withdrawal of residue from the tower is accomplished by a line 83 having a valve 84 controlled by a float 85. The line 83 is shown as being connected to the drag line 32 of the tower 10 and as extending to a cooling coil 86, the outlet of which extends to a pump 87 for removing the residue to tankage (not shown). A vapor line 88 is provided for removing the vapors to the fractionating tower 13 and the line is shown equipped with a valve 49a actuated by an element 41a for the purpose of retarding the flow of vapor as the pressure in the tower 12 or flow of vapors through the line 88 increases. The elements 41a and 49a are similar, respectively, to the elements 41 and 49 shown in Figure 5 which have heretofore been described in detail. The employment of the control mechanism 41a and 49a, while advantageous, is not essential and might well be eliminated.

The tower 13 is shown formed with an upper section D and a lower section E divided by a partition wall 89. The line 88 is shown entering the lower portion of the section D which contains a plurality of bubble trays 90. The condensate collected in the section D is removed by a line 91 having a valve 92 controlled by a float 93. The line 91 extends to a cooling coil 94 provided with an outlet line 95 to tankage (not shown). A vapor line 96 is provided for removing steam together with any oil vapors present and directing the combined vapors into the lower portion of section E which is shown provided with rock or other suitable contact material 97. A pipe 98 serves to introduce water to the section E which water may for example be water that has been removed from a condenser box employed in supplying cooling to the coil 73. A line 99 is shown constituting a vent to the atmosphere. Steam that is condensed in the section E together with such oil condensate as may have been formed from any oil vapors present is collected in the bottom of the tower 13 and removed by a pipe 100 to a trap or water leg 101 in which the oil and water are separated, the oil flowing out through a line 102 and the water being removed by the line 103. The line 102 is shown connected to the line 54. The reflux for the upper section D of the tower 13 is provided by a line 104 which is shown as a branch line of the reflux line 62 so that condensate from the section B of tower 11 may be employed as a reflux in the tower 13. If desired other condensate such for example as condensate withdrawn from the bottom of the tower 11 may well be employed as a reflux to the section D of the tower 13.

The discharge line 62 of the reflux pump 61 is shown provided with a branch line 105 connected to the line 83 so that if desired distillate withdrawn from the intermediate section B of the tower 11 may be mixed with residue obtained from the stills 10 and 12 for the purpose of reducing the viscosity of this residue to such degree as may be desired. In stead of utilizing the condensate from the section B of tower 11 for mixing with the still residue any of the other condensates formed in the process may well be employed, such for example as the heavy condensate withdrawn from the bottom of section D of tower 13.

In practic'ng the invention with the apparatus illustrated liquid oil which has been subjected to a cracking reaction for the conversion of higher boiling hydrocarbons into lower boiling ones, either w:th or without accompanying distillation, may be admitted through the line 14 to the primary distilling tower 10. Thus the synthetic product obtained by converting the oil in a vessel from which the vapors are not removed, or the residue resulting from carry'ng on the cracking with concomitant distillation in a pressure still, is passed through the pressure reducing valve 15 to be thus discharged into the expansion chamber 10 under reduced pressure. The pressure is reduced to such an extent as is necessary to effect the distillation of the fractions it is desired to remove from the liquid oil or residue. Thus, ordinarily when the conversion is carr:ed on under several hundred pounds pressure the expansion chamber 10 will be held at a pressure considerably reduced from that obtaining in the converters, such for example as pressures approximating atmospheric, and depending upon the exact conditions of delivering the liquid oil or residue from the cracking chambers the pressure in the expansion chamber 10 may ordinarily vary for example from approximately atmospheric pressure to 75 or 100 pounds pressure. It is desirable to reduce so far as practicable the pressure obtaining in the expansion chamber but it may be that while pressures approximating atmospheric such as 5 to 10 pounds may be maintained at times, that at other times during periods of heavy drags from the pressure stills the pressure may rise to the upper limits mentioned.

The liquid oil is discharged into the chamber 10 in a stream tangential to the wall of the chamber, as has been pointed out, so as to impart a whirling motion to the liquid between the concentric central hole baffles 16 thus facilitating the separation of the gas and vapors from the liquid residue. By discharging the oil tangentially into the chamber at a rapid rate a centrifugal force of sufficient magnitude to materially increase the separating effect over that which would otherwise take place may be accomplished. As an indication of the separating force which has been obtained in the practice of the invention it may be mentioned that in some operations carried on in accordance with the invention a separating force calculated as upwards of 770 times the force of gravity has been employed. In addition to the separating action carried on in the whirling mass of oil between the central hole baffles there is a further separation in the upper portion of the chamber 10. Thus the separating action that takes place in the still 10 may be referred to as a two-stage operation, the first of which is carried on at relatively high speed in which separation of the vapors from liquid takes place under the influence of centrifugal action and the second stage of which takes place in the upper part of the still 10 where the vapors travel at reduced velocity through the baffled portion of the chamber wherein any solid particles of suspended coke or carbon or heavy entrained liquids are separated out from the vapors by reason of the obstructing baffles and reduced velocity.

The vapors pass from still 10 through the vapor line 33 to the exchanger 34 and thence through the line 40 to the fractionating tower 11 wherein fractionation of the vapors takes place. Liquid residue is discharged into the secondary distilling chamber 12 into which steam which has been heated by heat exchange with the hot vapors from the expansion chamber 10 is introduced. The delivery of liquid or residue from the primary still 10 to the secondary still 12 is retarded as has heretofore been explained, by the operation of the valve 24 in the line 21 so that undue rises in pressure in the primary still 10 or a heavy influx of material through the line into the still 10 will not overload the secondary still 12 or cause the pressure to rise therein unduly. The delivery of vapors from the primary still 10 to its fractionating tower 11 is also retarded by the operation of the valve 49 in the line 33, as has heretofore been explained, so as to reduce the effect in the tower 11 of periods of high pressure or of increased evolution of vapor into the still 10.

In the fractionating equipment shown an overhead vapor fraction and three condensate cuts may be taken off the fractionating tower 11. Thus a gasoline or naphtha fraction may be taken off through the line 68, passed through the reflux condenser 69 and line 71 to the condenser coil 73, the distillate being collected in the receiver 75. Fractions constituting kerosene or light or intermediate gas oil fractions may be removed from the tower through the lines 52 and 58. These cuts may be sent to separate storage or, if desired, a portion or all of these fractions may be employed in refluxing towers 11 and 13, as has heretofore been explained. A heavier gas oil fraction may be withdrawn from the tower 11 through the line 65. The tower 13 in which are treated the vapors from the secondary still 12 is preferably operated so that a heavy gas oil fraction may be drawn off from the bottom of the section D through the line 91. It is preferable to maintain such temperatures in the section D that the steam which comes off from the still 12 together with the oil vapors though the line 88 will not be condensed and thus the steam together with the hydrocarbon constituents that remain in the vapor form under the temperatures obtaining in the section D pass out through the line 96 to the lower section E of the tower 13. Water is admitted to the contact material 97 to effect condensation of both the steam and the hydrocarbon vapors, the condensate being delivered through the line 100 to the water leg 101 in which separation of the oil and water takes place.

The distillation system described herein may be employed in distilling liquid oil or residue obtained from a single converter or battery of converters or it may be operated in conjunction with a plurality of converters or batteries thereof. By connecting the line 14 to a plurality of converters or batteries of converters and by properly timing the intervals between the taking of shots or drags it is possible to reduce to a greater or less extent, depending upon the number of batteries thus connected, the fluctuations in pressure and in volume of liquid obtaining in the primary still 10. But the invention described herein is well adapted for operation under conditions wherein extremely wide fluctuations in pressure and in volume of liquid delivered to the primary still may take place. In some cases instead of taking shots or drags from the converters the removal of liquid or residue may be made in a substantially continuous manner and in this type of operation the invention is of advantage since a continuous stream of liquid may be discharged tangentially into the chamber 10 between the concentric central hole baffles 16 and the separation of vapors and gases from liquid residue carried on in an effective manner.

The gas oil cuts or fractions that are removed from the fractionating towers 11 and 13 may advantageously be returned to the cracking stills or converters for further treatment. It is advantageous to return these reflux condensates to the converters in a heated condition and when it is desired to operate in this manner the cooling coils employed in cooling these condensates may be omitted or the coils may be employed only for cooling such portions of the condensates as it is desired to return to the towers to serve as reflux media therefor, the other portions of the condensates being conducted directly to a cracking zone for further treatment for the production of gasoline.

In order to obtain the maximum production of gas oil (often referred to as cycle gas oil) adapted for returning to the cracking zone for retreatment it is desirable to carry on the distillation of the pressure tar to such an extent that the resultant residue may have a higher viscosity or a lower A. P. I. gravity than may be required for a marketable fuel oil. In such case the heavy residue may be cut with a portion of the gas oil obtained from the distillation. One of the methods of operation contemplated by the invention consists in utilizing the heavier gas oil obtained for return to the cracking zone and employing a lighter or intermediate gas oil fraction for admixing with the heavy residue to thereby obtain a fuel oil that will meet the specifications desired. This method of operation has the advantage that the lighter or more refractory gas oil fractions which are difficult to crack are not returned to the cracking zone but are utilized in the preparation of the desired fuel oil while the heavier and less refractory gas oil fractions are employed in further cracking for the production of gasoline.

When using steam in distilling the pressure tar either in a single distilling chamber or when carrying on the distillation in two stages, such as has been described as applicable to stills 10 and 12 with the introduction of steam into the secondary distilling chamber 12, it has been found that when it is desired to obtain a residue to be used for fuel purposes it is satisfactory to use comparatively low temperature steam and when is is desired to obtain an asphalt best results are obtained by employing higher temperature steam.

In one method of operation contemplated by the invention oil which it is desired to distill or strip is heated to the desired distilling temperature in a tubular heater and then discharged into the still 10 tangentially of the chamber between the concentric central hole baffles 16 to thus accomplish an effective separation of the vapors from the liquid residue. This method of operation may be applied to a cracking process. Thus the oil to be converted may be raised to a cracking temperature in a coil or tubular heater under high superatmospheric pressure and cracked to the extent desired and then discharged into the still 10 which may be held at high superatmospheric pressure or at a pressure materially reduced from that obtaining in the coil. Separation of the vapors from the liquid is facilitated by discharging the oil from the coil into the still 10 tangentially and between the central hole baffles 16.

In describing herein the method of employing the still 10 no reference has been made to the application of heat to the still 10 other than that contained in the oil discharged thereinto for distillation because the operation carried on in this type of still is particularly adapted for carrying on distillation of oil which is received from a heated source, such as for example a coil or tubular heater or a heated body of oil from a cracking still, wherein the oil contains sufficient heat for effecting the desired vaporization when discharged into the still 10. However, it is to be understood that the application of heat to the still 10, or the use of a carrier gas, such as steam, is not precluded in the practice of the invention. However, one of the specific methods of operation contemplated by the invention consists in carrying on a distillation in a two-stage operation, such as has been described as obtaining in the stills 10 and 12 in which no heat need be applied to the still 10, the distillation being carried on therein by means of the heat contained in the oil discharged thereinto, and by the application of either heat or a carrier gas in the secondary distilling operation carried on in the still 12.

Although the preferred embodiment of the invention has been set forth in connection with apparatus having a particular construction and arrangement of parts and mode of operation, it is obvious that various changes and modifications may be made therein, while securing to a greater or less extent some or all of the benefits of the invention, without departing from the spirit and scope thereof. Therefore, only such limitations should be imposed as are indicated in the appended claims.

I claim:

1. Apparatus for the distillation of hydrocarbon oils comprising a primary still and a secondary still, means for introducing oil to the primary still, a conduit for conducting liquid oil from the primary still to the secondary still, a valve adapted to control the passage of liquid through the conduit and means for actuating said valve arranged to be actuated by the flow of liquid in the conduit, said actuating means being adapted to move the valve toward closed position as the flow of liquid tends to increase.

2. Apparatus for the distillation of hydrocarbon oils comprising a primary still and a secondary still, means for introducing oil to the primary still, a conduit for conducting liquid oil from the primary still to the secondary still, a valve adapted to control the passage of liquid through the conduit, means tending to hold the valve open and actuating means arranged to be actuated by the flow of liquid in the conduit, said actuating means being adapted to move the valve toward closed position as the flow of liquid tends to increase.

3. Apparatus for the distillation of hydrocarbon oils comprising a primary still and a secondary still, means for introducing oil to the primary still, a conduit for conducting liquid oil from the primary still to the secondary still, a valve adapted to control the passage of liquid through the conduit, means tending to hold the valve open and actuating means adapted to move the valve toward closed position when the flow of liquid through the valve exceeds a predetermined amount.

4. Apparatus for distilling hydrocarbon oils comprising a still adapted to contain variable quantities of liquid and to be operated under variable pressures, a fluid outlet for the still, a valve in said outlet, and means for actuating said valve arranged to be operated by the flow of fluid in said outlet and adapted to move the valve toward closed position upon a predetermined increase of the flow of fluid.

5. Apparatus for distilling hydrocarbon oils comprising a primary still, a secondary still, a conduit for conducting liquid from the primary still to the secondary still, means for controlling the passage of liquid through the conduit adapted to retard or restrict the transfer of liquid from the primary still to the secondary one when the amount of flow is increased a predetermined amount, a fractionating means for each still, a vapor line extending from each still to its respective fractionating means, a valve in each vapor line adapted to be actuated by the flow of vapor through the line so as to retard or restrict the transfer of vapors from a still to its fractionating means as the flow through the said lines tends to increase.

6. In the distillation of pressure tar, the process that comprises withdrawing heated tar or residue from a pressure cracking still and discharging it into an expansion still wherein variable reduced pressures and variable volumes of liquid are maintained and wherein vaporization takes place under the influence of the contained heat in the oil, withdrawing resultant residue from the expansion still and retarding the withdrawal of residue at periods of substantially maximum pressures or volumes in the still, passing liberated vapors from the expansion still to a fractionating operation and obstructing the passage of vapor from the still to the fractionating operation at periods of substantially maximum evolution of vapor thereby tending to prevent undue increases in pressure in the fractionating zone.

7. Apparatus for the distillation of hydrocarbon oils comprising a primary still and a secondary still, means for introducing oil to the primary still, a conduit for conducting liquid oil from the primary still to the secondary still, a valve adapted to control the passage of liquid through the conduit, means tending to hold the valve open and actuating means adapted to move the valve to the closed position when the flow of liquid through the valve exceeds a predetermined amount and to reopen the valve when the pressure differential between the up and down-stream sides of the latter falls below a predetermined amount.

8. Apparatus for the distillation of hydrocarbon oils comprising a primary still and a secondary still, means for introducing oil to the primary still, a conduit for conducting liquid oil from the primary still to the secondary still, a valve adapted to control transfer of oil through said conduit, means tending to hold said valve in the open position to permit the flow of liquid through the conduit, a contact element adapted to be contacted by the liquid flowing in the conduit and operatively connected to said valve so that as the flow of liquid is increased the valve is moved toward the closed position.

9. In combination, a still, means for supplying a variable flow of heated oil under superatmospheric pressure thereto for distillation therein, a conduit for removing fluid products from said still, a valve located in said conduit, and means responsive to the flow of fluid through said conduit adapted to move said valve toward a closed position when the flow of fluid through said conduit exceeds a predetermined rate.

10. In the distillation of pressure tar, the improvement which comprises withdrawing heated tar or residue from a pressure cracking still and discharging it into an expansion still wherein variable reduced pressures and variable volumes of liquid are maintained and wherein vaporization takes place under the influence of the contained heat in the tar or residue, and withdrawing fluid products from said expansion still, the withdrawal being automatically regulated in accordance with the pressure and volume of liquid within the still to retard the withdrawal of fluid at periods of maximum pressures or volumes in the still.

JAMES W. GRAY.